Sept. 16, 1952      R. C. HOWELL      2,610,354

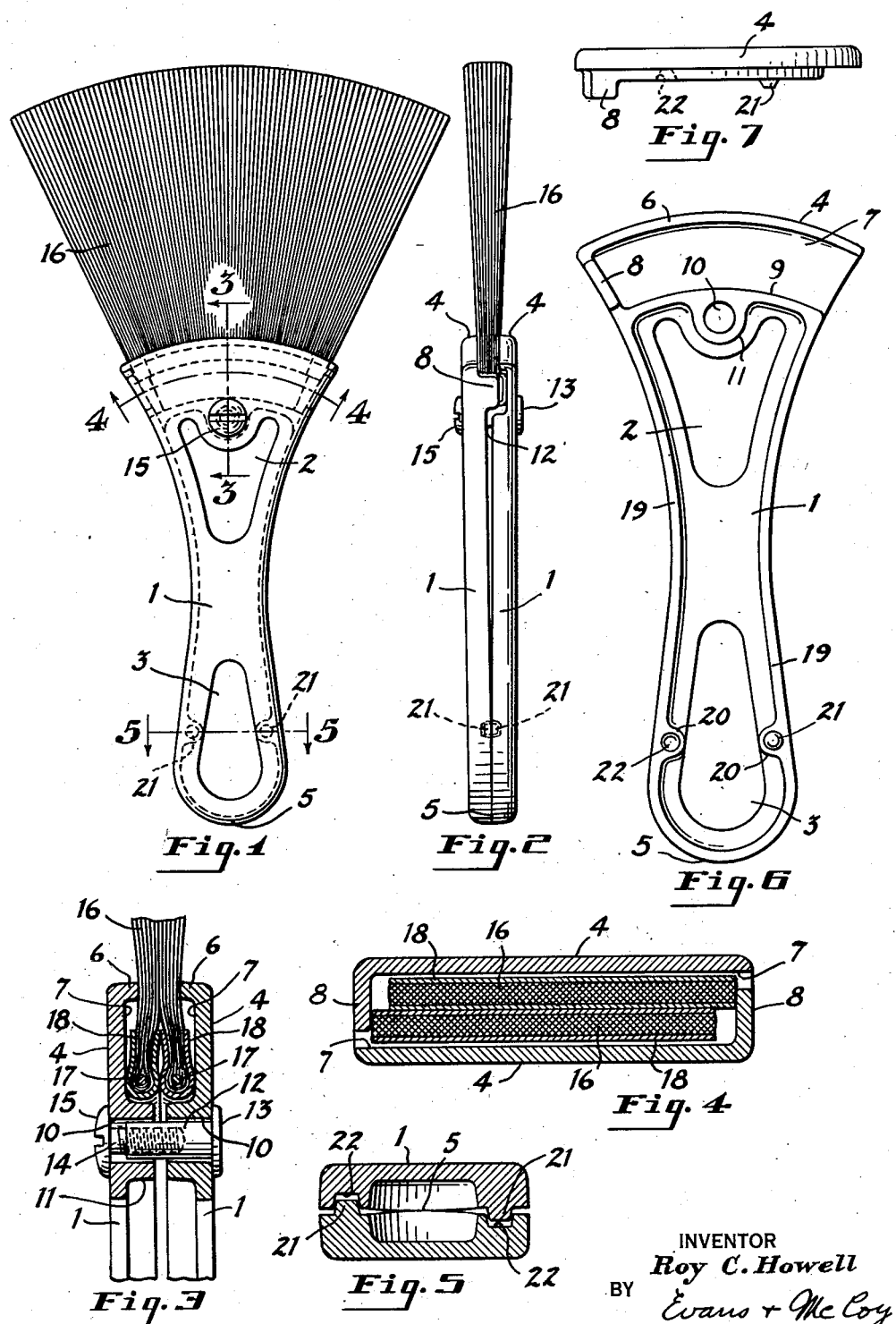

DETACHABLE HANDLE

Filed Jan. 31, 1950      2 SHEETS—SHEET 2

INVENTOR
Roy C. Howell

BY Evans + McCoy
ATTORNEYS

Patented Sept. 16, 1952

2,610,354

UNITED STATES PATENT OFFICE 2,610,354

DETACHABLE HANDLE

Roy C. Howell, Lakewood, Ohio

Application January 31, 1950, Serial No. 141,389

3 Claims. (Cl. 16—114)

This invention relates to handles for brushes or the like, and particularly to a handle composed of two sections of substantially the same size and shape and adapted to be releasably secured together and clamped upon a brush or other implement.

The invention has for an object to provide a sectional clamping handle which permits brush units or the like to be quickly and easily detached and replaced with new units when desired.

A further object of the invention is to provide a sectional clamping handle that is composed of two half sections that have clamping portions at one end and opposite end portions that have fulcruming engagement, the sections being provded with interengaging portions adjacent the fulcrum end that restrain relative movements of the sections when the sections are clamped upon a brush or other unit, the interengaging portions being so formed as not to interfere with the fulcruming of the sections into clamping engagement with the brush or other unit clamped by the sections.

An additional object of the invention is to provide half sections that are formed to fulcrum one upon the other and to interlock and that are of identical form so that both may be formed by means of a single mold or die.

With the above and other objects in view the invention may be said to comprise the handle as illustrated in the accompanying drawings and hereinafter described, together with such variations and modifications thereof as will be apparent to one skilled in the art to which the invention pertains.

Reference should be had to the accompanying drawings forming a part of this specification, in which:

Figure 1 is a front elevation of a handle embodying the invention and showing a brush clamped by the handle;

Fig. 2 is a side elevation of the handle and brush shown in Fig. 1;

Fig. 3 is a fragmentary longitudinal section taken on the line indicated at 3—3 in Fig. 1;

Fig. 4 is a transverse arcuate section taken on the line indicated at 4—4 in Fig. 1;

Fig. 5 is a transverse section taken on the line indicated at 5—5 in Fig. 1;

Fig. 6 is a plan view of one of the two identical hand sections looking toward the inner face thereof;

Fig. 7 is an end elevation of the handle section;

Figure 8:
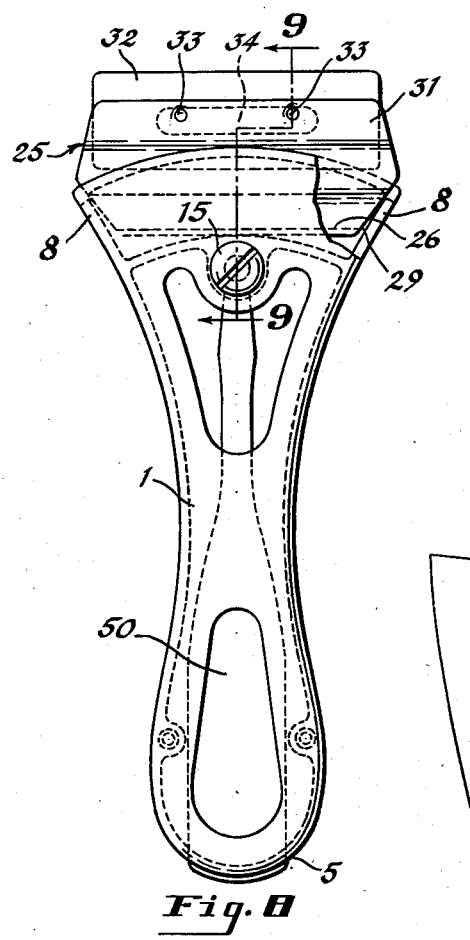
Fig. 8 is a side elevation showing the handle of the present invention with an adapter and razor blade clamped therein.

The handle of the present invention is comprised of two sections of corresponding size and shape that are secured together face to face to clamp a suitable implement such as a brush between the sections. The two sections of the handle are preferably of identical form so that they may be produced in the same mold or by means of the same die.

As herein shown, each handle section 1 is shaped to provide half of an elongated hand grip, and the two sections may be provided with registering openings 2 and 3 to reduce the weight of the handle. Each clamping section has a wide clamping end 4 and a fulcruming portion 5 at its opposite end. The clamping portion 4 is recessed to accommodate the artcle clamped by the handle, and as herein shown has a short arcuate clamping flange 6 at its outer edge, the flange 6 forming the outer wall of an arcuate channel 7 extending across the widened edge portion 4. The arcuate channel 7 of each section is open at one end and is closed at its opposite end by a flange 8 that projects past the inner face of the section to extend into and obstruct the open end of the channel of the other section. The channel has an inner wall in the form of a transverse rib 9, and the two sections are provided inwardly of the rib 9 with registering openings 10 that are formed in bosses 11 extending inwardly from the clamping portions.

The two handle sections are clamped together and to the brush unit or other article by means of a bolt of the binding post type, the post portion having a tubular body 12 that is internally threaded and adapted to fit loosely in the registering openings 10 and a head 13 that is engageable with the outer face of one of the handle sections. The length of the tubular body 12 is less than the combined thickness of the two handle sections, and this body receives a screw 14 that is provided with a head 15 for engagement with the outer face of a handle section. When the handle sections and bolt are assembled with a brush between the clamping end portions 4, the two handle sections are caused to fulcrum about their end portions 5 and are drawn together into clamping engagement with a brush or other article inserted between the clamping portions 4 when the screw 14 is tightened.

As herein shown, the brush has a body composed of bristles 16 looped around a stiff wire core 17 and secured to the wire core by means of a sheet metal channel member 18 that clamps the bristles to the core. The bristles 16 may be formed of pliant material such as broom straw, plastic or animal hair, or of stiff material such as steel wire. Brush elements such as herein illustrated are of the type commonly used in rotating sweepers and are manufactured in the form of continuous strips which may be cut to suitable lengths.

As shown in Fig. 3, two brush segments may be clamped side by side between the clamping portions 4 of the handles, the flanges 6 clamping the bristles outwardly of the retaining channels 18, and the channels 7 of the handle providing a recess of sufficient width to receive the bristle retaining elements.

The inner faces of the handle sections 1 may be provided with a marginal rib 19, and the fulcruming portions 5 are formed by the edges of these ribs at the end of the handle remote from the clamping portion 4. Adjacent the fulcruming portions 5 each of the handle sections is provided with bosses 20 projecting inwardly from the marginal rib 19 and these bosses are provided, one with a projecting lug 21, and the other with a recess 22 of a size and shape corresponding to that of the projection 21. The projection and recess of each of the handles are on opposite sides of and at equal distance from the longitudinal center line of the handle and in alinement perpendicularly to the said axis, so that the two identically formed handle sections have interlocking engagement.

The handle sections 1 are symmetrical with respect to their longitudinal central axes so that the marginal ribs 19 of one are directly opposed to the marginal ribs 19 of the other, and so that the obstructing flanges 8 of the two sections are disposed at opposite sides of the brush or other article clamped between the clamping faces.

The interfitting lugs 21 and recesses 22 retain the fulcruming tips 5 in engagement while the clamping ends 4 of the handle sections are being drawn into tight engagement with the brush or other implement clamped by the handle and also hold the handle sections against lateral displacement with respect to one another.

The channel-shaped bristle retainers 18 serve as adapters for positioning the brush in the clamping portion of the handles, providing a stiff enlargement of the brush body adapted to seat against the ribs 9 and to be confined within the flanges 6 at the outer edge of the clamping channel and between the end flanges 8 at the ends of the clamping channel. By means of the fulcruming action of the handle sections adequate clamping pressure may be applied to the brush by means of the screw 14.

Figure 9:
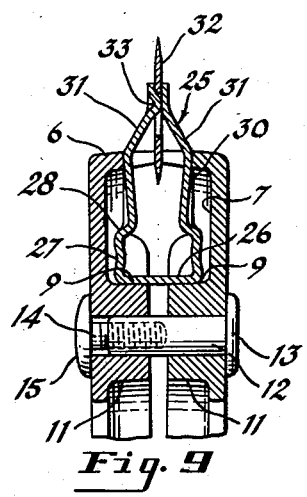
Fig. 9 is a section through the clamping portion of the handle, the adapter and blade taken on the line indicated at 9—9 in Fig. 8.

In some instances the adapter portion of the implement mounted in the handle may be a separable member instead of an integral part of the implement, as shown in Figs. 8 and 9. The adapter 25 shown in Figs. 8 and 9 is channel-shaped and formed of resilient sheet metal having a flat base 26 of a width to be received in the clamping channel of the handle and adapted to seat against the arcuate ribs 9. The side walls of the adapter 25 have portions 27 adjacent the base 26 that are perpendicular to the base and are inset outwardly of the base 26 to provide shoulders 28. The base 26 is of a length to fit between the flanges 8 when disposed against the ribs 11 and at right angles to the handles, and the ends of the adapter adjacent the base are beveled at 29 to fit within the outwardly diverging flanges 8 of the handle sections. Outwardly of the shoulders 27 the side walls have outwardly diverging portions 30 and, outwardly of the portions 30, the side walls terminate in converging clamping portions 31 adapted to receive between them an implement such as a razor blade 32. One of the clamping portions may be provided with spaced protuberances 33 adapted to enter a slot 34 in the blade 32. The height of the portions 27 of the side walls is such that, when the base 26 engages the mid points of the arcuate ribs 9, the shoulders 28 will be engaged by the ends of the arcuate flange 6 as shown in Fig. 8, and the diverging portions 30 provide bulges at opposite sides of the channel with which the central portions of the flanges 6 engage to press the portions 31 into clamping engagement with the blade 32.

Figure 10:
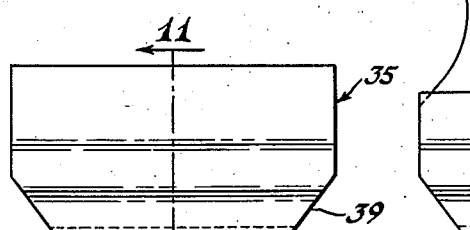
Fig. 10 is a side elevation of a scraping tool provided with a base portion shaped to fit within the clamping portion of the handle.
Figure 11:
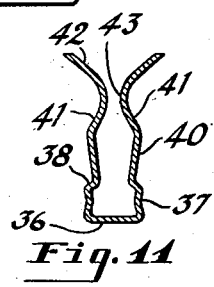
Fig. 11 is a section through the tool shown in Fig. 10 taken on the line indicated at 11—11 in Fig. 10.

In Figs. 10 and 11 of the drawing a sheet metal implement is shown which is formed of sheet metal and which has a base portion shaped to provide an adapter 35 similar to the adpater 25 above described, the adapter 35 having a base 36, side walls with inner portions 37, shoulders 38, end bevels 39 and outer portions 40 corresponding to the base 26 and wall portions 27, 28, 29 and 30 above described. The side walls of the adapter 36 have portions 41 converging outwardly from the portions 40 and terminating in diverging scraper blades 42, the walls being curved to provide convex inner faces 43 that engage to brace the blades 42 when the adapter is clamped between the flanges 6 of the handle.

Figure 12:
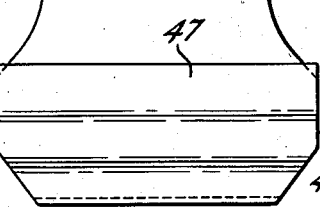
Fig. 12 is a side elevation of a modified form of scraping tool.
Figure 13:
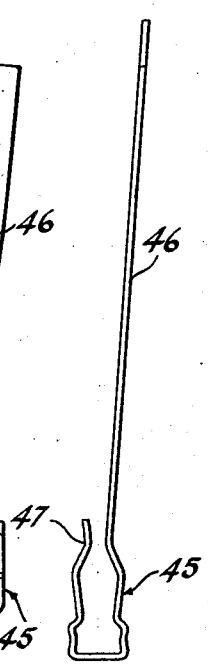
Fig. 13 is an edge view of the tool shown in Fig. 12.

In Figs. 12 and 13 a sheet metal implement is shown having an adapter base portion 45 substantially the same as the adapters 25 and 35 previously described, one side wall of the adapter having an extension forming a scraper blade 46 and the other side wall having an extension 47 that engages with the extension 46 to brace the same when the adapter is clamped between the flanges 6 of the handle.

The handle 1 being hollow may serve as a receptacle for an additional tool such as the screw driver 50 shown in Fig. 8, a suitable opening being provided in the end portion 5 of the handle through which the screw driver may be inserted or removed.

It is to be understood that in accordance with the provisions of the patent statutes, variations and modifications of the specific devices herein shown and described may be made without departing from the spirit of the invention.

What I claim is:

1. A handle comprising two sections of the same size and shape and having opposed inner faces provided with widened recessed clamping portions at one end and engageable portions at the opposite end, said faces having interfitting projecting and recessed portions adjacent said opposite end for restricting relative movements of said engaging ends, said projections being rounded to provide a bearing upon which said sections may rock, each section having a centrally disposed opening adjacent its clamping portion and inwardly thereof, and a pressure applying connector extending through said openings, said connector comprising a tubular internally threaded body having a head engageable with the outer face of one section and a screw threaded into said body and having a head engageable with the outer face of the other section.

2. A handle comprising two identical sections having opposed inner faces with engageable end portions and provided with widened recessed clamping portions at the opposite end, each of said inner faces being symmetrical with respect to a central longitudinal axis and having a projection and a recess adjacent its engageable end portion, the projection and recess of each section being on opposite sides of said axis at equal distances therefrom and alined perpendicularly to said axis to interfit with the recess and projection of the other section to limit relative movements of the engaging ends of said sections, said projections being rounded to provide a bearing upon which said sections may rock, said sections having centrally disposed registering openings inwardly of said clamping portions and adjacent thereto, and a screw actuator extending through said openings for applying pressure to said clamping portions.

3. The combination with a handle comprising two sections of substantially the same size and shape which have opposed inner faces with fulcrum forming and movement limiting portions adjacent one end and widened clamping portions at their opposite ends provided with registering transverse channels and projections for obstructing opposite ends of the channels and means for drawing the clamping portions together, of an adapter of channel shape formed of resilient sheet metal of a length to fit between said projections at the ends of the channels in the clamping portions of the handle section and having side walls that project past the end of the handle and that have outer converging edge portions beyond the end of the handle, said converging portions of the side walls being normally spaced apart and movable into engagement when said side walls are subjected to clamping pressure between the handle sections.

ROY C. HOWELL.

REFERENCES CITED

The following references are of record in the file of this patent:

UNITED STATES PATENTS

| Number | Name | Date |
|---|---|---|
| 1,356,799 | Tompson | Oct. 26, 1920 |
| 1,730,820 | Holden | Oct. 8, 1929 |
| 1,827,509 | Ericsson | Oct. 13, 1931 |
| 2,308,162 | Frank | Jan. 12, 1943 |
| 2,422,510 | Ward | June 17, 1947 |